United States Patent [19]

Boku et al.

[11] Patent Number: 5,745,277
[45] Date of Patent: Apr. 28, 1998

[54] SCANNER OPTICS AND IMAGE FORMATION APPARATUS USING THE SAME

[75] Inventors: Kazutake Boku, Yao; Motonobu Yoshikawa, Osaka; Yoshiharu Yamamoto, Toyonaka; Hironori Nakashima, Takarazuka; Akinori Yusa, Kadoma, all of Japan

[73] Assignee: Matsushita Electric Industrial Co., Ltd., Kadoma, Japan

[21] Appl. No.: 445,175

[22] Filed: May 19, 1995

[30] Foreign Application Priority Data

May 23, 1994 [JP] Japan .................................. 6-108723

[51] Int. Cl.⁶ .................................................. G02B 26/08
[52] U.S. Cl. ...................... 359/207; 359/206; 359/216; 359/217
[58] Field of Search .......................... 359/205–207, 359/216–219, 708, 711, 717, 718, 662; 347/258–260; 250/234–236

[56] References Cited

U.S. PATENT DOCUMENTS

| | | |
|---|---|---|
| 4,379,612 | 4/1983 | Matsuoka et al. ............... 359/205 |
| 4,955,682 | 9/1990 | Yamaguchi et al. ............. 359/206 |
| 5,005,928 | 4/1991 | Suzuki et al. .................... 359/206 |
| 5,157,532 | 10/1992 | Yoshikawa et al. ............. 359/196 |
| 5,189,546 | 2/1993 | Iizuka ............................... 359/206 |

FOREIGN PATENT DOCUMENTS

| | | |
|---|---|---|
| 56-36622 | 4/1981 | Japan . |
| 61-120112 | 6/1986 | Japan . |
| 61-243422 | 10/1986 | Japan . |
| 63-210819 | 9/1988 | Japan . |
| 3231218 | 10/1991 | Japan . |
| 3251807 | 11/1991 | Japan . |

*Primary Examiner*—James Phan
*Attorney, Agent, or Firm*—Renner, Otto, Boisselle & Sklar

[57] ABSTRACT

The scanner optics of this invention includes a condensing lens arrangement composed of a first aspherical lens having a positive refractive power and a convex meniscus surface on the side of the scanning surface and a second toric lens of which incident surface is saddle toroidal where a point on the incident surface has a greater radius of curvature in the sub-scanning direction as the point is farther from the optical axis in the scanning direction. A laser light flux emitted from a light source is deflected and scanned by a polygon mirror so as to form an image on a scanning surface via the condensing lens arrangement.

3 Claims, 9 Drawing Sheets

SCANNER OPTICS AND IMAGE FORMATION APPARATUS USING THE SAME

BACKGROUND OF THE INVENTION

1. Field of the Invention

The present invention relates to a scanner optics used for a laser printer and the like, and more specifically relates to a scanner optics having a function of compensating a tilt of an optical deflection surface of a polygon mirror which may occur when a laser light flux is deflected by the polygon mirror, and an image formation apparatus using such a scanner optics.

2. Description of the Related Art

A pre-objective type scanner optics is often used for the conventional laser printer and the like, where a condensing lens arrangement is disposed after a polygon mirror which deflects a laser light flux. In the pre-objective type scanner optics, a laser light flux emitted from a laser diode is made substantially parallel by a collimator lens. After the beam-shaping by a cylindrical lens and the like, the parallel laser light flux is incident to the polygon mirror. The incident light flux is reflected and deflected by the polygon mirror, so as to form a spot on a scanning surface such as a photosensitive drum via a condensing lens arrangement. The polygon mirror is rotated at a constant angular velocity, thus realizing the scanning of the surface with the spot. The condensing lens arrangement has an optical function of keeping the scanning speed of the spot constant in a scanning direction. The condensing lens arrangement also has a function of compensating "a tilt of the deflection surface of the polygon mirror" (hereinafter, simply referred to as a "surface tilt") by arranging the deflection point on the polygon mirror and the scanning surface of the photosensitive drum so that they are in the conjugate relationship in a sub-scanning direction from the geometrical optics point of view.

A known general method for compensating the surface tilt is to provide the condensing lens arrangement with an anamorphic surface, as described in Japanese Laid-Open Patent Publication No. 61-243422, for example. The "anamorphic surface" as used herein refers to a surface which is toric and aspherical. However, a distortion, especially in the sub-scanning direction, cannot be sufficiently corrected. As a result, the diameter of the spot formed on the scanning surface varies depending on the position of the scanning, making it difficult to realize image formation with a broad field angle and high resolution.

In a scanner optics arranged in a two-dimensional plane, the optical characteristics such as spherical aberration and distortion are asymmetric in the scanning direction, making it difficult to uniformly correct the image formation performance over the entire scanning surface.

The objective of the present invention is to provide a small-size scanner optics with a broad field angle and high performance over the entire scanning surface.

SUMMARY OF THE INVENTION

The scanner optics of this invention deflects a laser light flux emitted from a light source with a polygon mirror and scans a scanning surface with the deflected laser light flux via a condensing lens arrangement. The condensing lens arrangement comprises: a first aspherical lens having a positive refractive power and a convex meniscus surface on a side of the scanning surface; and a second toric lens having a positive refractive power, the refractive power of the second toric lens in a sub-scanning direction at a center portion in a scanning direction being different from the refractive power of She second toric lens at a peripheral portion.

In one example, an incident surface of the second toric lens is saddle toroidal where a point on the incident surface has a greater radius of curvature in the sub-scanning direction as the point is farther from an optical axis in the scanning direction.

In another example, the second toric lens has at least one aspherical surface in the scanning direction.

In still another example, an emergent surface of the second toric lens is barrel toroidal where a point on the emergent surface has a smaller radius of curvature in the sub-scanning direction as the point is farther from the optical axis in the scanning direction.

In still another example, an expression (1):

$$0.3 < \frac{f_y \cdot d_2}{r_{3x} \cdot r_{4x}} < 4.5 \quad (1)$$

is satisfied where $r_{3x}$ is a radius of curvature of the incident surface of the second toric lens in the subscanning direction at a center of the optical axis, $r_{4x}$ is a radius of curvature of the emergent surface of the second toric lens in the sub-scanning direction at the center of the optical axis, $f_y$ is a synthetic focal length of the first aspherical lens and the second toric lens in the scanning direction, and $d_2$ is a thickness of the second toric lens.

In still another example, an expression (2):

$$0.3 < \frac{y_m}{YD \cdot f_y} < 2.6 \quad (2)$$

is satisfied where YD is an amount of decentering of the condensing lens arrangement in the scanning direction with respect to the optical axis, $y_m$ is a maximum image height formed by the condensing lens arrangement, and $f_y$ is a synthetic focal length of the first aspherical lens and the second toric lens in the scanning direction.

In another aspect of the present invention, an image formation apparatus is provided. The apparatus comprises: means for electrifying a photosensitive surface; means for forming a static latent image on the photosensitive surface by use of the scanner optics described in claim 1; means for developing the static latent image; and means for transferring the developed image onto a transfer medium.

In the scanner optics of the present invention, the incident surface of the second toric lens of the condensing lens arrangement is saddle toroidal and the emergent surface thereof is barrel toroidal. With this configuration, an increase in the amount of distortion in the sub-scanning direction caused by expanding the field angle can be effectively corrected, and a variation in the diameter of the spot formed on the scanning surface depending on the position of the scanning can be minimized.

By decentering the condensing lens arrangement in the scanning direction with respect to the optical axis, a good optical performance can be obtained over the entire scanning width.

Thus, the invention described herein makes possible the advantages of (1) providing a scanner optics capable of effectively correcting a distortion in the sub-scanning direction while realizing a broad field angle and minimizing a variation in the diameter of a spot formed on a scanning surface, (2) providing a scanner optics capable of achieving a good optical performance over the entire scanning width, and (3) providing a small-size image formation apparatus with a broad field angle and high resolution at low cost.

DESCRIPTION OF THE PREFERRED EMBODIMENTS

Figure 1:
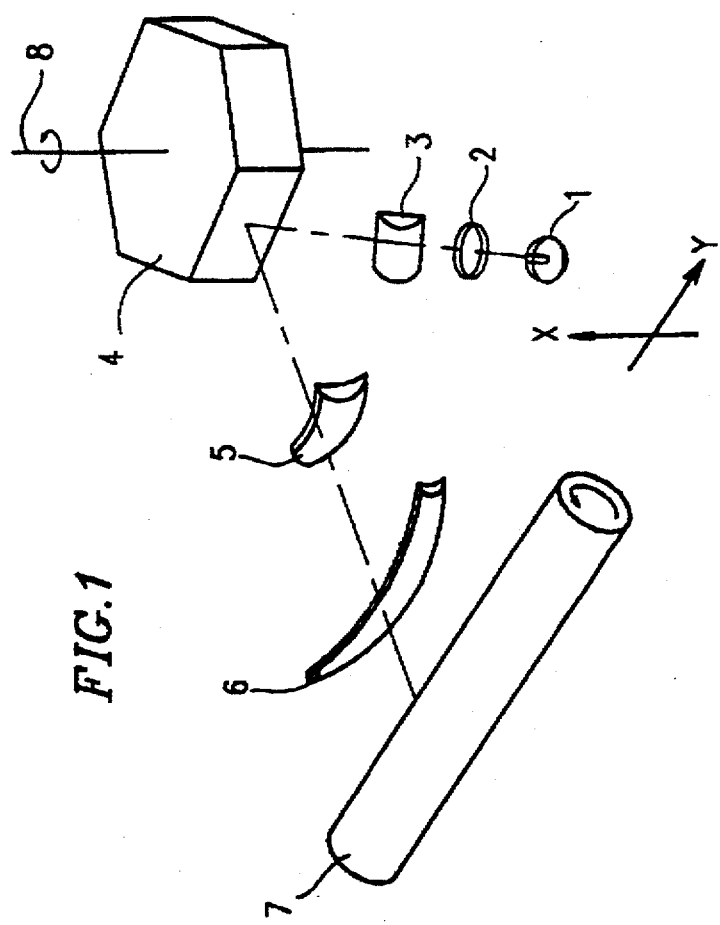
FIG. 1 shows a configuration of a scanner optics according to the present invention.

The present invention will be described by way of examples with reference to the accompanying drawings. In the following description, the same reference numerals in the drawings denote the same components.

FIG. 1 shows a configuration of a scanner optics which covers Examples 1, 2, and 3 of the present invention. The scanner optics includes a laser diode 1, a collimator lens 2, a cylindrical lens 3, a polygon mirror 4, a first lens 5, and a second lens 6. The polygon mirror 4 rotates around a rotational axis 8. The reference numeral 7 denotes a photosensitive drum.

Figure 2:
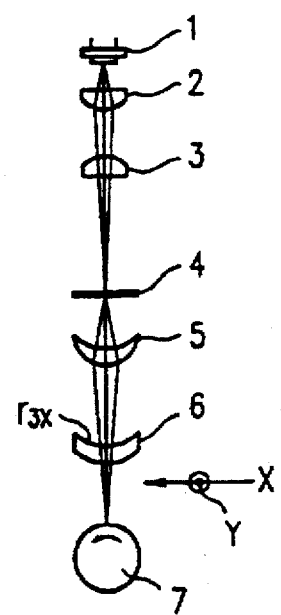
FIG. 2 is a sectional view of the scanner optics of Example 1 as viewed in the scanning direction.
Figure 3:
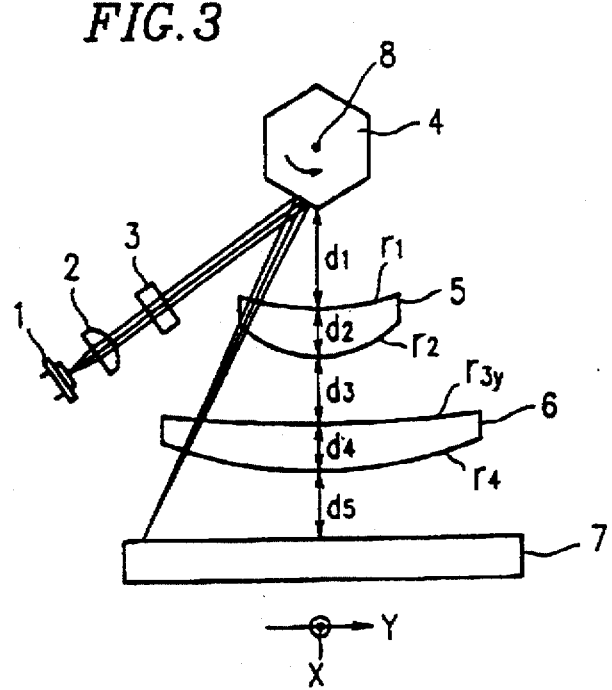
FIG. 3 is a sectional view of the scanner optics of FIG. 2 as viewed in the sub-scanning direction.
Figure 6:
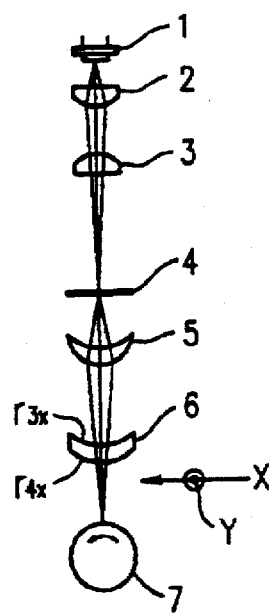
FIG. 6 is a sectional view of the scanner optics of Examples 2 and 3 as viewed in the scanning direction.
Figure 7:
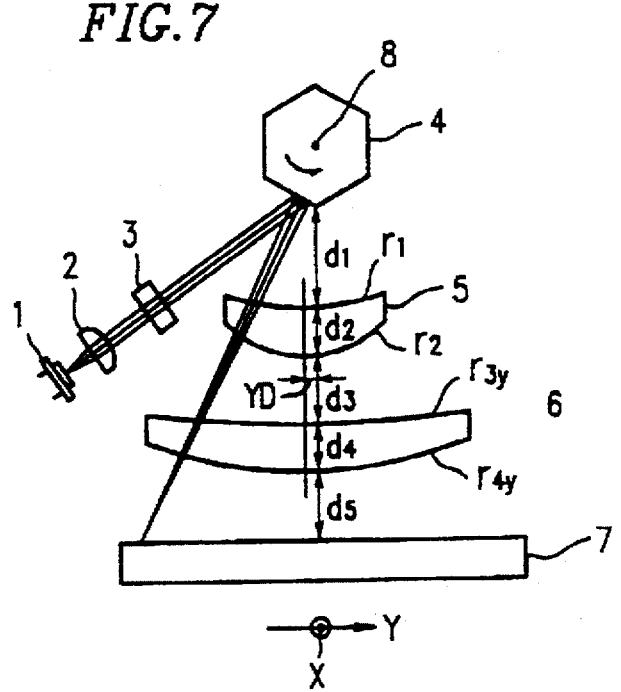
FIG. 7 is a sectional view of the scanner optics of FIG. 6 as viewed in the sub-scanning direction.

FIGS. 2 and 3 are sectional views of the scanner optics of Example 1 as is viewed in a scanning direction Y and a sub-scanning direction X, respectively. FIGS. 6 and 7 are sectional views of the scanner optics. of Examples 2 and 3 as is viewed in the scanning direction Y and the sub-scanning direction X, respectively.

Hereinbelow, the operation of the scanner optics will be described with reference to FIGS. 1 and 2. The "scanning direction Y" refers to a direction of the rotational axis of the photosensitive drum shown in FIG. 1, while the "sub-scanning direction X" refers to a direction vertical both To a direction of a laser light flux incident to the photosensitive drum shown in FIG. 1 and the rotational axis of the photosensitive drum.

Referring to FIGS. 1, 2 and 3, a laser light flux emitted from the laser diode 1 is made substantially parallel by the collimator lens 2 and then converged by the cylindrical lens 3 so that a laser flux in the sub-scanning direction X forms an image in the vicinity of the polygon mirror 4. The polygon mirror 4 which rotates around the rotational axis 8 deflects the incident laser light flux to effect scanning. The deflected laser light flux passes through a condensing lens arrangement composed of the first lens 5 which is an aspherical lens and the second lens 6 which is an toric lens, so as to form an image on the photosensitive drum 7. The first lens 5 and the second lens 6 are arranged so that the deflection point on the polygon mirror 4 and the scanning surface of the photosensitive drum 7 are in a conjugate relationship in the sub-scanning direction X from the geometrical optics point of view. Thus, a tilt of the polygon mirror 4 is compensated. The incident surface of the toric lens 6 is saddle toroidal where a point on the incident surface has a greater radius of curvature in the sub-scanning direction X as the point is farther from the optical axis in the scanning direction Y. This saddle toroidal surface is effective in correcting a distortion in the sub-scanning direction X. However, when a scanner optics having a broader field angle is desired, the saddle toroidal surface is not enough to sufficiently correct a distortion in the sub-scanning direction X, and the curvature in the sub-scanning direction X also becomes smaller. The production of such a scanner optics is difficult, resulting in increasing production cost. This problem can be overcome by adopting a barrel toroidal surface where a point on the incident surface of the toric lens 6 has a smaller radius of curvature in the sub-scanning direction X as the point is farther from the optical axis in the scanning direction Y. Thus, a distortion in the sub-scanning direction X can be effectively corrected even when a broader field angle is desired. A variation in the diameter of the spot formed on the scanning surface can also be minimized.

The scanner optics of this embodiment satisfies expression (1):

$$0.3 < \left| \frac{f_y \cdot d_2}{r_{3x} \cdot r_{4x}} \right| < 4.5 \tag{1}$$

where $r_{3x}$ is the radius of curvature of the incident surface of the second lens 6 as the toric lens in the sub-scanning direction X at the center of the optical axis, $r_{4x}$ is the radius of curvature of the emergent surface of the second lens 6 in the sub-scanning direction X at the center of the optical axis, $f_y$ is synthetic focal length of the first lens 5 and the second lens 6 constituting the condensing lens arrangement in the scanning direction Y, and $d_2$ is the thickness of the second lens 6 as the toric lens.

Expression (1) will be explained from the technical point of view.

Expression (1) relates to the ratio of the radius of curvature $r_{3x}$ of the incident surface of the toric lens 6 in the sub-scanning direction X at the center of the optical axis, the radius of curvature $r_{4x}$ of the emergent surface of the toric lens 6 in the sub-scanning direction X at the center of the optical axis, the synthetic focal length $f_y$ of the aspherical lens 5 and the toric lens 6 in the scanning direction Y, and the thickness d2 of the toric lens 6. This is mainly used for effectively correcting a distortion in the sub-scanning direction X in a broad field angle region. When both the radius of curvature $r_{3x}$ and the radius of curvature $r_{4x}$ are small, and the resultant ratio exceeds the upper limit of expression (1), the correction of the distortion in the sub-scanning direction x is excessive. As a result, a desired optical performance is not obtainable, and thus it is difficult to expand the field angle of the scanner optics. Conversely, when both the radius of curvature $r_{3x}$ and the radius of curvature $r_{4x}$ are large, and the resultant ratio exceeds the lower limit of expression (1), the correction of the distortion in the sub-scanning direction X is insufficient.

In this embodiment, in order to effectively correct a distortion in the scanning direction Y and the fθ characteristic and obtain a good optical performance over the entire effective scanning width, the toric lens 6 preferably has at least one aspherical surface in the scanning direction Y.

The scanner optics of this embodiment also satisfies expression (2):

$$0.3 < \frac{y_m}{YD \cdot f_y} < 2.6 \qquad (2)$$

where YD is the amount of decentering of the first lens 5 and the second lens 6 constituting the condensing lens arrangement in the scanning direction Y with respect to the optical axis thereof, $y_m$ is the maximum image height formed by the first lens 5 and the second lens 6, and $f_y$ is the synthetic focal length of the first lens 5 and the second lens 6 in the scanning direction Y.

Expression (2) will be explained from the technical point of view.

Expression (2) relates to the ratio of the amount of decentering YD of the first lens 5 and the second lens 6 in the scanning direction Y with respect to the optical axis, the synthetic focal length $f_y$ of the first lens 5 and the second lens 6 in the scanning direction Y, and the maximum image height $y_m$ formed by the first lens 5 and the second lens 6. This is mainly used for the condensing lens arrangement constructed in the two-dimensional plane, so as to prevent the optical performance of the scanner optics from degrading due to the asymmetry of the image formation performance such as spherical aberration and distortion in the scanning direction Y, and thus to obtain a good optical performance over the entire effective scanning width. When the amount of decentering YD is small, and the resultant ratio exceeds the upper limit of expression (2), the correction of the asymmetry of the image formation performance in the scanning direction Y is insufficient. Thus, it is difficult to effectively correct the optical performance. On The contrary, when the amount of decentering YD is great, and The resultant ratio exceeds the lower limit of expression (2), the optical performance degrades in a direction reverse to the direction of the image height of which correction is insufficient in the scanning direction Y.

As described above, by adopting the lens configuration and conditions according to the present invention, a small-size scanner optics with a broad field angle can be realized. Using such a scanner optics, a distortion in the scanning direction Y and the sub-scanning direction X can be effectively corrected, and a good optical performance can be obtained over the entire scanning width.

Exemplary parameters are shown below as Examples 1 to 3. The exemplary parameters of Example 2 satisfy expression (1) and the exemplary parameters of Example 3 satisfy expressions (1) and (2). In the examples, $f_y$ is the synthetic focal length of The first lens 5 and the second lens 6 in the scanning direction Y, F denotes an F number, and θ denotes the scanning angle. $r_1$, $r_2$, and $r_4$; are paraxial radii of curvatures of the lens surfaces of the condensing lens arrangement (the. order corresponds to the actual order from the deflection point side. This is also applicable to The following description): $r_{3y}$ and $r_{4y}$ are paraxial radii of curvatures of the lens surfaces in the scanning direction Y: $r_{3x}$ and $r_{4x}$ are radii of curvatures of the lens surfaces in the sub-scanning direction X at the center of the optical axis: $d_1$, $d_2$, $d_3$, and $d_4$ are distances between the adjacent lens surfaces, i.e., the surface separation or the air gap: and $n_1$ and $n_2$ are refractive indexes of lens materials at a wavelength of 780 nm. The amount of decentering of the first lens 5 and the second lens 6 constituting The condensing lens arrangement with respect to the optical axis in the scanning direction Y is YD, and the aspherical surfaces (indicated by * mark) are defined by expression (3):

$$z = \frac{cy^2}{1 + \sqrt{(1-(1+k)c^2y^2)}} + DY^4 + EY^5 + FY^8 + GY^{10} \qquad (3)$$

where Z is the distance of a vertex of an aspherical surface of which height from the optical axis is y from the nodal plane, y is the height from the optical axis, c is the curvature of the aspherical vertex, k is the conical constant, and D, E, F, and G are the aspherical coefficients.

| (Example 1) | | |
|---|---|---|
| $f_y$ = 175 mm | | |
| θ = 18.0° | F: scanning direction | 37.5 |
| | sub-scanning direction | 37.5 |
| | $d_1$ = 19.6 | |
| $r_1$* = −77.4 | $d_2$ = 10.0 | $n_1$ = 1.51 |
| $r_2$* = −43.1 | $d_3$ = 118.2 | |
| $r_{3y}$ = −421.6 | $d_4$ = 6.0 | $n_2$ = 1.52 |
| $r_{3x}$ = 24.2 | | |
| $r_4$* = −487.5 | | |

The surfaces marked * are aspherical surfaces. The aspherical coefficients of these aspherical surfaces are shown below.

| | $r_1$ | $r_2$ | $r_4$ |
|---|---|---|---|
| k | −4.82805 | −0.46423 | 0.0 |
| D | 1.03575 × 10⁻⁰⁶ | 7.38887 − 10⁻⁰⁷ | −1.50743 × 10⁻⁰⁷ |
| E | 1.23933 × 10⁻⁰⁹ | 4.24684 × 10⁻¹⁰ | 6.33546 × 10⁻¹² |
| F | −1.97891 × 10⁻¹² | 1.39509 × 10⁻¹² | −4.91801 × 10⁻¹⁶ |
| G | −2.51182 × 10⁻¹⁵ | −1.85545 × 10⁻¹² | 1.57302 × 10⁻²⁰ |

Figure 4:
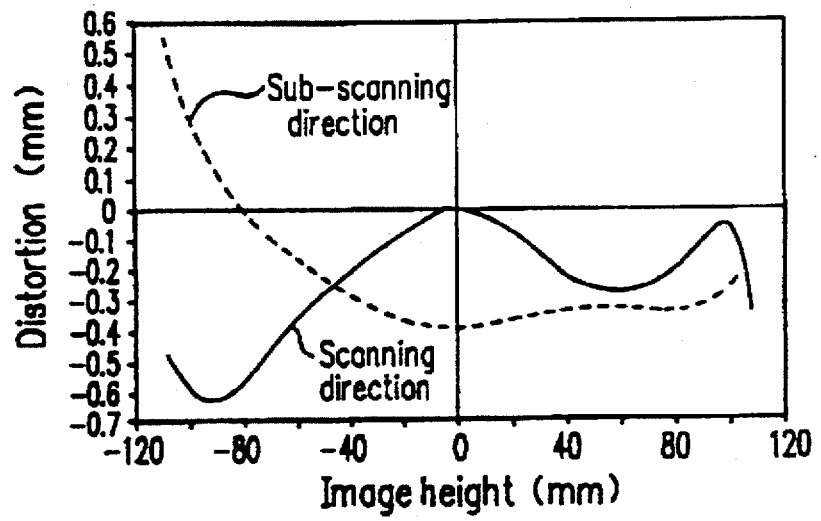
FIG. 4 is a graph representing the amount of distortion obtained by Example 1.
Figure 5:
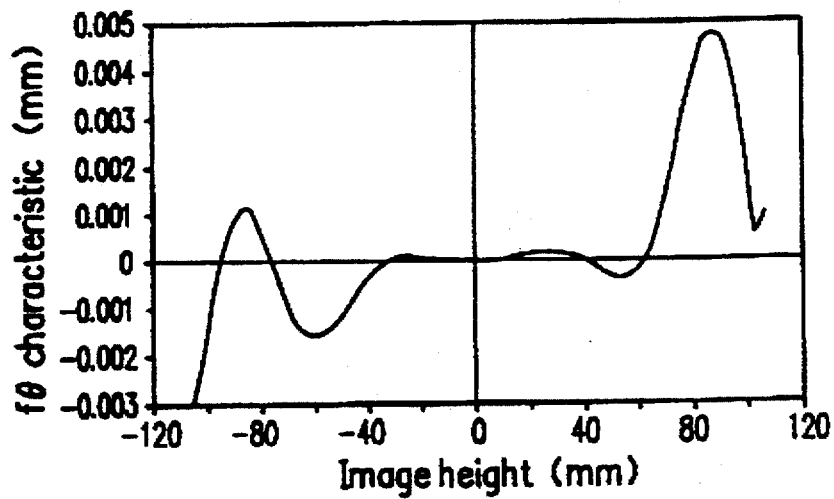
FIG. 5 is a graph representing the fθ characteristic obtained by Example 1.

The amount of distortion and the fθ characteristic obtained in Example 1 are shown in FIGS. 4 and 5, respectively.

| (Example 2) | | |
|---|---|---|
| $f_y$ = 146 mm | | |
| θ = 21.6° | F: scanning direction | 37.5 |
| YD = 0.0 mm | sub-scanning direction | 37.5 |
| | $d_1$ = 23.1 | |
| $r_1$* = −104.6 | $d_2$ = 13.0 | $n_1$ = 1.51 |
| $r_2$* = −45.0 | $d_3$ = 96.2 | |
| $r_{3y}$ = −528.3 | $d_4$ = 18.0 | $n_2$ = 1.52 |
| $r_{3x}$ = 21.8 | | |
| $r_{4y}$* = −495.0 | | |
| $r_{4x}$ = −240.8 | | |

The surfaces marked * are aspherical surfaces. The aspherical coefficients of these aspherical surfaces are shown below.

| | $r_1$ | $r_2$ | $r_{4y}$ |
|---|---|---|---|
| k | −1.51526 | −0.20170 | 0.0 |
| D | 2.16455 × 10⁻⁰⁷ | 1.17389 × 10⁻⁰⁷ | −1.66129 × 10⁻⁰⁷ |
| E | −1.30064 × 10⁻⁰⁹ | −4.21083 × 10⁻¹⁰ | 3.19423 × 10⁻¹² |
| F | −7.11922 × 10⁻¹³ | −2.71728 × 10⁻¹³ | 2.94542 × 10⁻¹⁶ |
| G | 6.68585 × 10⁻¹⁶ | −5.67109 × 10⁻¹⁶ | −2.83341 × 10⁻²⁰ |

Figure 8:
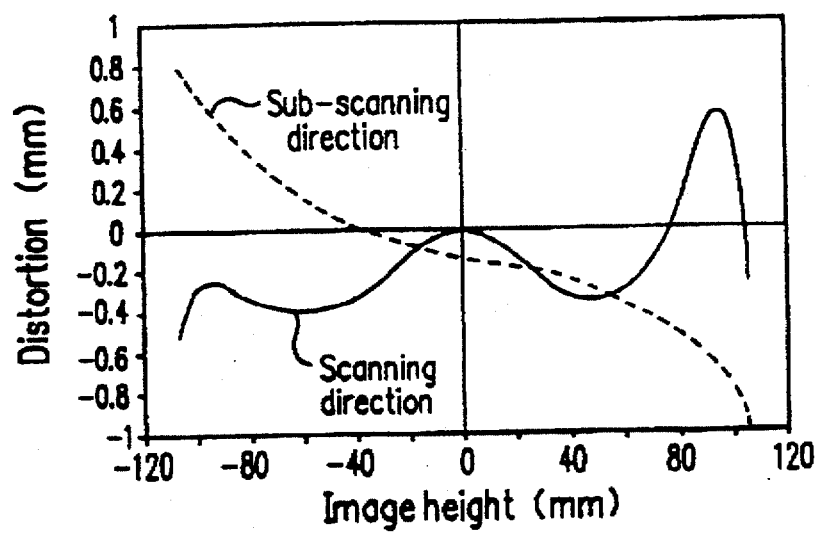
FIG. 8 is a graph representing the amount of distortion obtained by Example 2.
Figure 9:
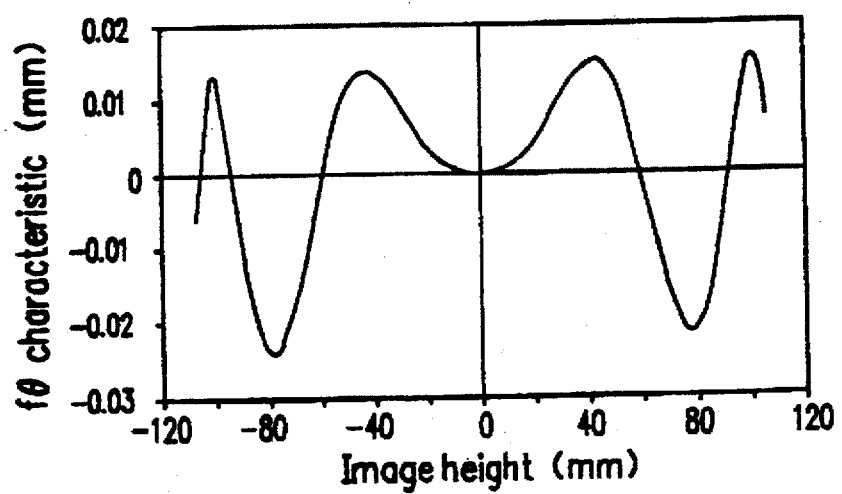
FIG. 9 is a graph representing the fθ characteristic obtained by Example 2.

The amount of distortion and the fθ characteristic obtained in Example 2 are shown in FIGS. 8 and 9, respectively.

(Example 3)

| | | | | |
|---|---|---|---|---|
| $Y_m =$ | 108 mm | | | |
| $f_y =$ | 145 mm | | | |
| $\theta =$ | 21.7° | F: | scanning direction | 37.5 |
| $YD =$ | 0.3 mm | | sub-scanning direction | 37.5 |
| | | $d_1 = 23.0$ | | |
| $r_1^* =$ | −104.1 | $d_2 = 12.9$ | $n_1 = 1.51$ | |
| $r_2^* =$ | −44.8 | $d_3 = 95.7$ | | |
| $r_{3y} =$ | −525.8 | $d_4 = 17.9$ | $n_2 = 1.52$ | |
| $r_{3x} =$ | 21.7 | | | |
| $r_{4y}^* =$ | −492.6 | | | |
| $r_{4x} =$ | −239.6 | | | |

The surfaces marked * are aspherical surfaces. The aspherical coefficients of these aspherical surfaces. are shown below.

| | $r_1$ | $r_2$ | $r_{4y}$ |
|---|---|---|---|
| k | −1.51526 | −2.01696 | 0.0 |
| D | $4.58412 \times 10^{-07}$ | $1.48629 \times 10^{-07}$ | $-1.66216 \times 10^{-07}$ |
| E | $-1.40979 \times 10^{-09}$ | $-2.29345 \times 10^{-10}$ | $3.07831 \times 10^{-12}$ |
| F | $-1.10948 \times 10^{-12}$ | $-2.96234 \times 10^{-13}$ | $2.45722 \times 10^{-16}$ |
| G | $8.51806 \times 10^{-16}$ | $-7.96030 \times 10^{-16}$ | $-2.33873 \times 10^{-20}$ |

Figure 10:
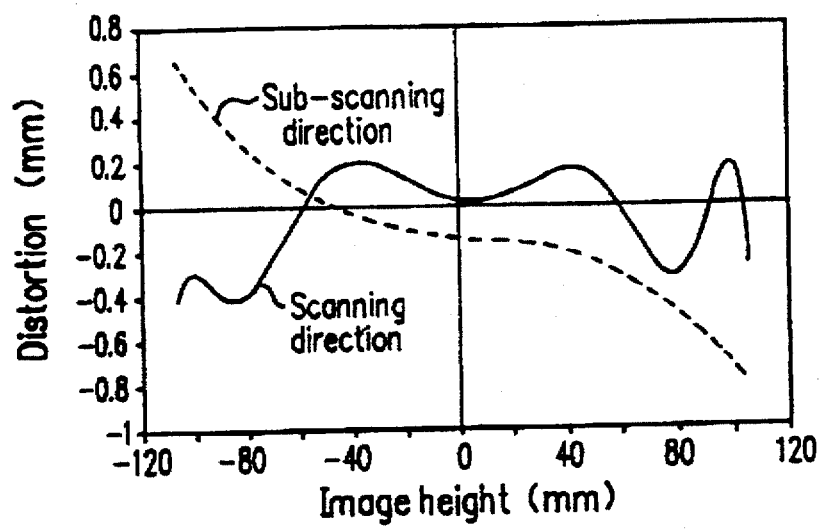
FIG. 10 is a graph representing the amount of distortion obtained by Example 3.
Figure 11:
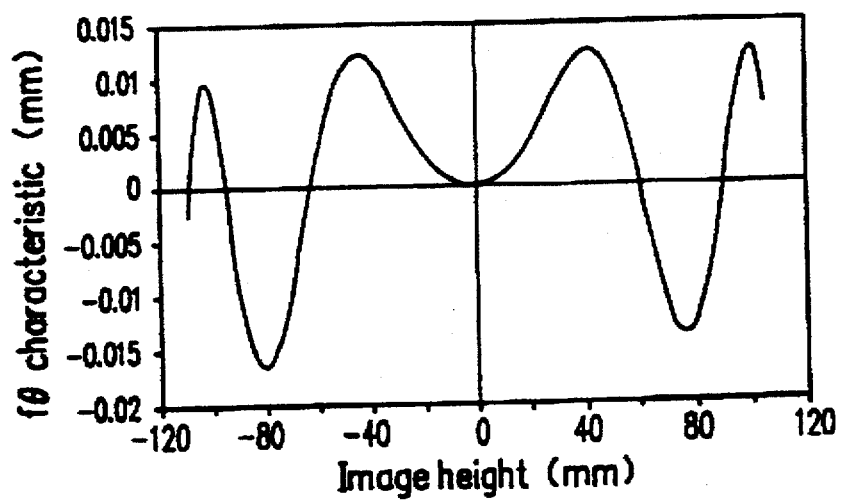
FIG. 11 is a graph representing the fθ characteristic obtained by Example 3.

The amount of distortion and the fθ characteristic obtained in Example 3 are shown in FIGS. 10 and 11, respectively.

Figure 12:
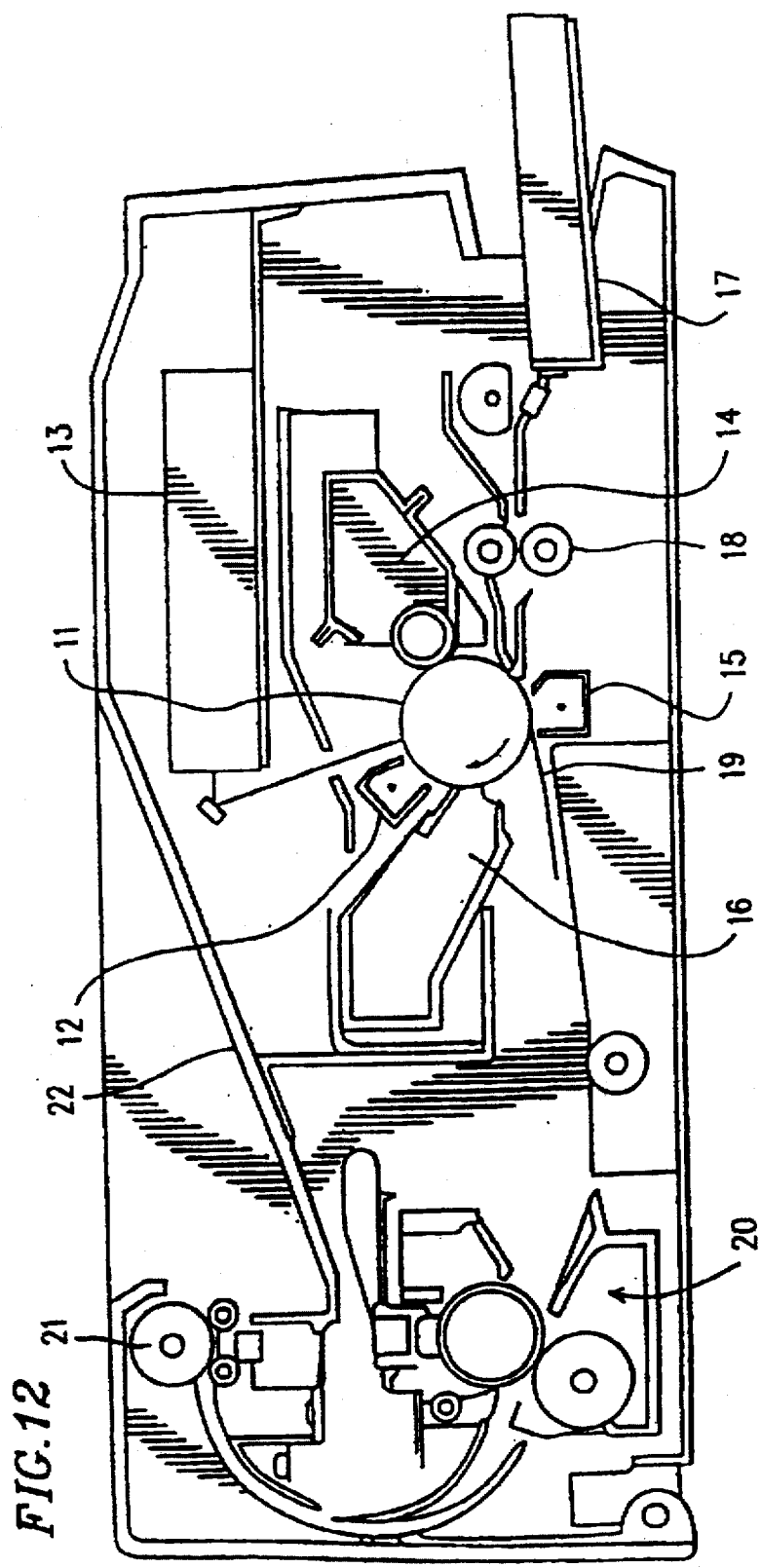
FIG. 12 shows an image formation apparatus using the scanner optics according to the present invention.

FIG. 12 shows an image formation apparatus adopting the scanner optics of the embodiment according to the present invention.

Referring to FIG. 12, the image formation apparatus includes a photosensitive drum 11, a primary electrifier 12, a scanner optics 13 according to the present invention, a developer 14, a transfer electrifier 15, a cleaner 16, a sheet feed cassette 17, a sheet feed roller 18, a transfer sheet 19, a fixing device 20, a sheet ejection roller 21, and a sheet ejection tray 22.

The operation of the image formation apparatus with the above structure will be described. The surface of the photosensitive drum 11 is uniformly electrified to have a predetermined polarity by the primary electrifier 12. Image information is projected onto the electrified surface of the photosensitive drum 11 via the. scanner optics 13. Charges on portions of the photosensitive drum 11 which are irradiated with light are repelled, while charges on the remaining portions which are not irradiated with light are maintained, thereby forming a static latent image corresponding to the image information. Electrified colored fine grains called toner are fed from the developer 14 to the static latent image and attach to the remaining charges, so as to develop the image. The developed image is superimposed on a transfer sheet 19 fed from the sheet feed cassette 17 via the sheet feed roller 18. Then, the transfer electrifier 15 applies charges having a polarity reverse to that of the toner grains to the outer surface of the transfer sheet 19 which is not in contact with the developed image. Thus, the image is transferred to the transfer sheet 19. After the transfer sheet 19 is separated from the photosensitive drum 11, the transferred image on the transfer sheet 19 is fixed by the fixing device 20. The transfer sheet 19 having the fixed image is then ejected onto the sheet ejection tray 22 via the sheet ejection roller 21. Thereafter, the photosensitive drum 11 is cleaned by removing the remaining toner by the cleaner 16 and returns to the initial electrifying step.

Thus, a small-size image formation apparatus with a broad field angle and high resolution can be realized at low cost by adopting the scanner optics of the present invention.

Various other modifications will be apparent to and can be readily made by those skilled in the art without departing from the scope and spirit of this invention. Accordingly, it is not intended that the. scope of the claims appended hereto be limited to the description as set forth herein, but rather that the claims be broadly construed.

What is claimed is:

1. A scanner optics for deflecting a laser light flux emitted from a light source with a polygon mirror and scanning a scanning surface with the deflected laser light flux via a condensing lens arrangement, the condensing lens arrangement comprising: a first aspherical lens having a positive refractive power and a convex meniscus surface on a side of the scanning surface; and a second toric lens having a positive refractive power, the refractive power of the second toric lens in a sub-scanning direction at a center portion in a scanning direction being different from the refractive power of the second toric lens at a peripheral portion;

wherein an emergent surface of the second toric lens is barrel toroidal where a point on the emergent surface has a smaller radius of curvature in the sub-scanning direction as the point is farther from the optical axis in the scanning direction.

2. A scanner optics for deflecting a laser light flux emitted from a light source with a polygon mirror and scanning a scanning surface with the deflected laser light flux via a condensing lens arrangement, the condensing lens arrangement comprising: a first aspherical lens having a positive refractive power and a convex meniscus surface on a side of the scanning surface; and a second toric lens having a positive refractive power, the refractive power of the second toric lens in a sub-scanning direction at a center portion in a scanning direction being different from the refractive power of the second toric lens at a peripheral portion;

wherein an emergent surface of the second toric lens is barrel toroidal where a point on the emergent surface has a smaller radius of curvature in the sub-scanning direction as the point is farther from the optical axis in the scanning direction, and an expression (1):

$$0.3 < \left| \frac{f_y \cdot d_2}{r_{3x} \cdot r_{4x}} \right| < 4.5 \tag{1}$$

is satisfied where $r_{3x}$ is a radius of curvature of the incident surface of the second toric lens in the sub-scanning direction at a center of the optical axis, $r_{4x}$ is a radius of curvature of the emergent surface of the second toric lens in the sub-scanning direction at the center of the optical axis, $f_y$ is a synthetic focal length of the first aspherical lens and the second toric lens in the scanning direction, and $d_2$ is a thickness of the second toric lens.

3. A scanner optics for deflecting a laser light flux emitted from a light source with a polygon mirror and scanning a scanning surface with the deflected laser light flux via a condensing lens arrangement, the condensing lens arrangement comprising: a first aspherical lens having a positive refractive power and a convex meniscus surface on a side of the scanning surface; and a second toric lens having a positive refractive power, the refractive power of the second toric lens in a sub-scanning direction at a center portion in a scanning direction being different from the refractive power of the second toric lens at a peripheral portion;

wherein an emergent surface of the second toric lens is barrel toroidal where a point on the emergent surface has a smaller radius of curvature in the sub-scanning direction as the point is farther from the optical axis in the scanning direction, an expression (1):

$$0.3 < \left| \frac{f_y \cdot d_2}{r_{3x} \cdot r_{4x}} \right| < 4.5 \quad (1)$$

is satisfied where $r_{3x}$ is a radius of curvature of the incident surface of the second toric lens in the sub-scanning direction at a center of the optical axis, $r_{4x}$ is a radius of curvature Of the emergent surface of the second toric lens in the sub-scanning direction at the Center of the optical axis, $f_y$ is a synthetic focal length of the first aspherical lens and the second toric lens in the scanning direction, and $d_2$ is a thickness of the second toric lens, and an expression (2):

$$0.3 < \frac{y_m}{YD \cdot f_y} < 2.6 \quad (2)$$

is satisfied where YD is an amount of decentering of the condensing lens arrangement in the scanning direction with respect to the optical axis, $y_m$ is a maximum image height formed by the condensing lens arrangement, and $f_y$ is a synthetic focal length of the first aspherical lens and the second toric lens in the scanning direction.

* * * * *